United States Patent
Kim

(10) Patent No.: US 7,098,965 B2
(45) Date of Patent: Aug. 29, 2006

(54) DIGITAL VIDEO SIGNAL PROCESSING SYSTEM AND METHOD

(75) Inventor: Hak-jae Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 430 days.

(21) Appl. No.: 10/224,557

(22) Filed: Aug. 21, 2002

(65) Prior Publication Data

US 2003/0107679 A1    Jun. 12, 2003

(30) Foreign Application Priority Data

Dec. 12, 2001  (KR) .................... 10-2001-0078648

(51) Int. Cl.
*H04N 9/64* (2006.01)

(52) U.S. Cl. .................. 348/649; 348/659; 348/651

(58) Field of Classification Search ............... 348/649, 348/651, 659, 660; 345/603, 604
See application file for complete search history.

(56) References Cited

U.S. PATENT DOCUMENTS

| | | | |
|---|---|---|---|
| 4,217,603 A | 8/1980 | Hjortzberg | |
| 4,679,072 A * | 7/1987 | Takayama | ................... 358/520 |
| 4,724,476 A | 2/1988 | Nakagawa et al. | |
| 5,526,051 A | 6/1996 | Gove et al. | |
| 5,909,254 A | 6/1999 | Feig et al. | |
| 6,515,714 B1 * | 2/2003 | Tachibana | .................... 348/654 |
| 6,552,751 B1 * | 4/2003 | Shigeta | ........................ 348/659 |
| 6,686,971 B1 * | 2/2004 | Oh | ............................. 348/649 |

FOREIGN PATENT DOCUMENTS

| | | |
|---|---|---|
| JP | 2000-92337 | 3/2000 |
| KR | 2000-41319 | 7/2000 |

OTHER PUBLICATIONS

Korean Office Action dated Apr. 23, 2004.

* cited by examiner

*Primary Examiner*—Victor R. Kostak
(74) *Attorney, Agent, or Firm*—Staas & Halsey LLP

(57) ABSTRACT

A digital video signal processing system which includes a scaler converting a video signal having a luminance signal and chrominance signals into a digital RGB signal, further including a hue adjusting part adjusting hue represented by the chrominance signals; wherein the scaler includes an operating part operating a rotational transfer matrix rotation-transforming color coordinates of the chrominance signals according to an adjusting value inputted through the hue adjusting part. Accordingly, a digital video signal processing system and method, in which rotational transform of color coordinates is accomplished by a rotational transfer matrix prior to a color transfer matrix of a scaler without a hardware component therefor is provided.

17 Claims, 4 Drawing Sheets

DIGITAL VIDEO SIGNAL PROCESSING SYSTEM AND METHOD

CROSS-REFERENCE TO RELATED APPLICATIONS

This application claims the benefit of Korean Application No. 2001-78648, filed Dec. 12, 2001, in the Korean Intellectual Property Office, the disclosure of which is incorporated herein by reference.

BACKGROUND OF THE INVENTION

1. Field of the Invention

The present invention relates to a digital video signal processing system and a method, in which rotational transform of color coordinates is easily accomplished by a rotational transfer matrix prior to a color transfer matrix of a scaler without a hardware component therefor.

2. Description of the Related Art

For the development of digital technology and multimedia services, there has been developed various media supporting digital multimedia services. Moreover, when digital broadcasting services are widely commercialized, the production of a digital display apparatus would be greatly extended.

Contrary to a CRT (cathode ray tube) directly scanning a video signal, the digital display apparatus such as a PDP (plasma display panel), an LCD (liquid crystal display), etc., processing and displaying a digital video signal comprises a scaler converting a video signal into the output format fit to the display panel. The scaler converts an inputted video signal into a video signal to be displayed on a panel by adjusting a vertical frequency of the inputted video signal, a resolution (the number of pixels) and a ratio of a screen (16:9, 4:3).

FIG. 4 is a control block diagram of a conventional digital video signal processing system. As shown in FIG. 4, the conventional digital video signal processing system comprises a video decoder 103 processing a video signal for an NTSC (national television standards committee) TV or a VHS (video home system) video, an ADC (analog to digital converter) 101 processing a digital video signal for a DVD (digital versatile disk), an HD (high definition) TV, or etc., and a scaler 105 converting a video signal processed by the video decoder 103 or the ADC 101 into a video signal to be displayed on the panel.

The video decoder 103 receives a video signal for the NTSC TV, the VHS video, etc., and divides the video signal into a Y signal related to luminance and R-Y and B-Y signals related to chrominance. Herein, the R-Y and B-Y signals are employed in generating RGB (red, green, blue) signals. Hereinafter, the luminance (Y) signal and the chrominance (B-Y and R-Y) signals outputted from the video decoder 103 will be represented by a $YC_bC_r$ signal.

The ADC 101 processes a video signal for the DVD, the HDTV, or etc., and the luminance (Y) signal and the chrominance (B-Y and R-Y) signals outputted from the ADC 101 will be represented by a $YP_bP_r$ signal.

The scaler 105 includes a color transfer matrix 109 converting the $YC_bC_r$ and $YP_bP_r$ signals into digital RGB signals. The color transfer matrix 109 is previously determined according to the format of the video signal, and for example, FIG. 4 shows the color transfer matrix 109 converting the $YC_bC_r$ signals into the digital RGB signals according to an ITU-RBT601 format. Therefore, the scaler 105 converts the $YC_bC_r$ and $YP_bP_r$ signals into the digital RGB signals by the color transfer matrix 109 while converting the $YC_bC_r$ and $YP_bP_r$ signals into video signals fit for the vertical frequency, the resolution, and the ratio of the screen according to the output format of the panel.

As described above, a conventional scaler converts an inputted video signal into a digital RGB signal by a predetermined matrix. However, in order to adjust hue in the conventional scaler, the scaler must have an IC (integrated circuit) capable of rotational transform of color coordinates of an inputted video signal, that is, to adjust the hue without the IC capable of the rotational transform of the color coordinates is not possible with a conventional scaler.

SUMMARY OF THE INVENTION

Accordingly, a digital video signal processing system and method, in which rotational transform of color coordinates is accomplished by a rotational transfer matrix prior to a color transfer matrix of a scaler without a hardware component therefor is provided.

Additional objects and advantages of the invention will be set forth in part in the description which follows and, in part, will be obvious from the description, or may be learned by practice of the invention.

The above and other objects of the present invention may be accomplished by a digital video signal processing system comprising a scaler converting a video signal having a luminance signal and chrominance signals into a digital RGB signal, further comprising a hue adjusting part adjusting hue represented by the chrominance signals; wherein the scaler includes an operating part operating a rotational transfer matrix rotation-transforming color coordinates of the chrominance signals according to an adjusting value inputted through the hue adjusting part.

In one aspect of the present invention, the rotational transfer matrix for transferring a point "P" at a phase "p" to a point "Q" at a phase "q" is represented by $$Q = \begin{pmatrix} \cos(q) & -\sin(q) \\ \sin(q) & \cos(q) \end{pmatrix} \begin{pmatrix} \cos(p) & -\sin(p) \\ \sin(p) & \cos(p) \end{pmatrix}.$$

Also, the adjusting value inputted through the hue adjusting part defines a phase rotation-transforming the color coordinates of the chrominance signals.

According to another aspect of the present invention, the above and other objects may be also achieved by a digital video signal processing method comprising a scaler converting a video signal having a luminance signal and chrominance signals into a digital RGB signal, comprising inputting an adjusting value adjusting hue represented by the chrominance signals; rotation-transforming the color coordinates of the chrominance signals depending upon the inputted adjusting value through a rotational transfer matrix; and converting the rotated chrominance signals into the digital RGB signal.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

Figure 1:
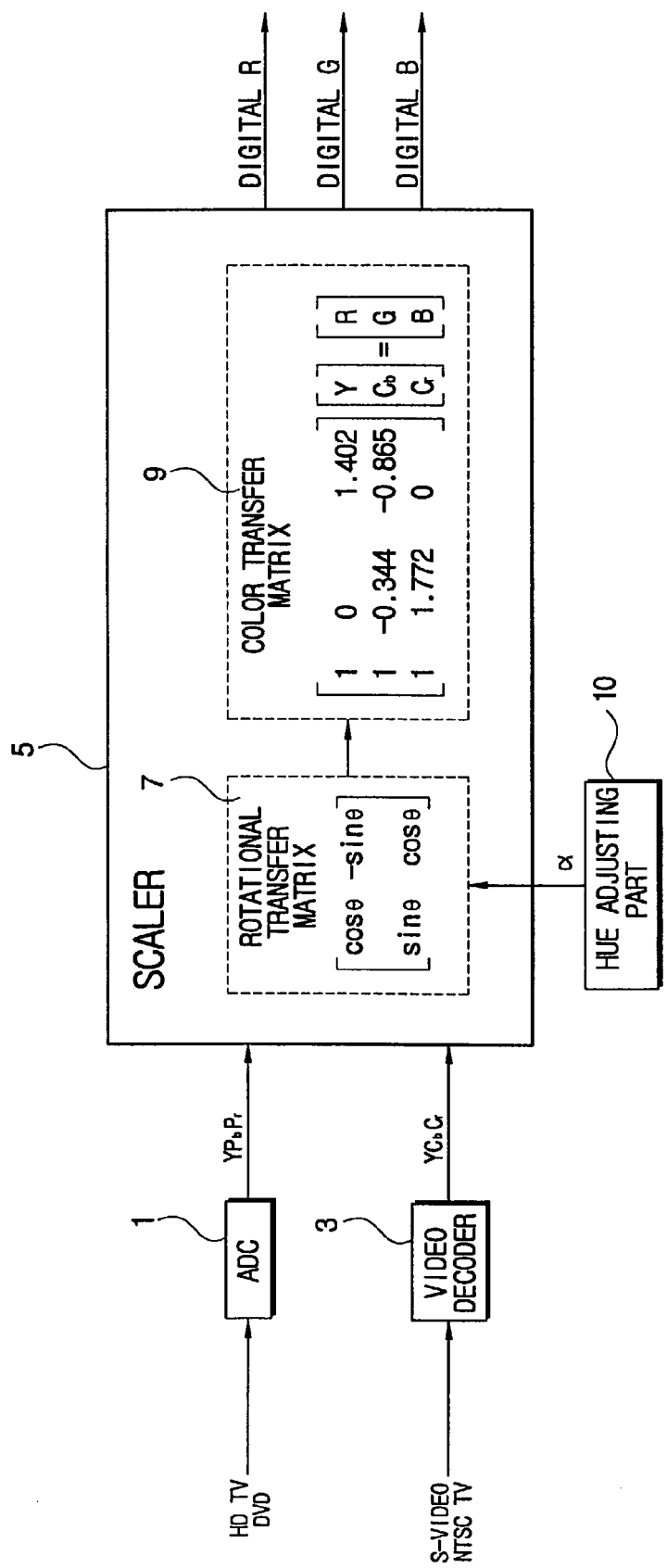
FIG. 1 is a control block diagram of a digital video signal processing system according to an embodiment of the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

As shown in FIG. 1, a digital video signal processing system comprises a video decoder 3 processing a video signal for an NTSC TV, a VHS video, etc., an ADC 1 processing a digital video signal for a DVD, an HDTV, or etc., and a scaler 5 converting a video signal processed by the video decoder 3 the ADC 1 into a video signal to be displayed on a panel.

The video decoder 3 processes a video signal for the NTSC TV, the VHS video, etc., and outputs $YC_bC_r$ signals, and the ADC 1 processes a video signal for the DVD, the HDTV, etc., and outputs the $YP_bP_r$ signal. Herein, "Y" indicates luminance signal, "$C_b$" and "$P_b$" indicate chrominance (B-Y) signals between blue and green, and "$C_r$" and "$P_r$" indicate chrominance (R-Y) signals between red and green.

The scaler 5 converts the $YC_bC_r$ and $YP_bP_r$ signals into a video signal fit for a vertical frequency, a resolution, a ratio of a screen and the like according to an output format of the panel, and converts the $YC_bC_r$ and $YP_bP_r$ signals into digital RGB signals for picture display by a color transfer matrix 9.

Herein, the color transfer matrix 9 is previously determined according to a format of the video signal, and for example, FIG. 1 shows the color transfer matrix 9 converting the $YC_bC_r$ signals into the digital RGB signals according to an ITU-RBT601 format.

The digital video signal processing system further comprises a hue adjusting part 10 adjusting hue, and a rotational transfer matrix 7 rotation-transforming color coordinates of the chrominance signals according to an adjusting value of the hue adjusting part 10. Therefore, the chrominance signals of the digital RGB signals are adjusted by the color transfer matrix 9 after rotation-transforming the $YC_bC_r$ signals through the rotational transfer matrix 7. Herein, the color coordinates are comprised of two mutually perpendicular families of colors to be displayed on the panel, and a hue adjustment of the display panels is equivalent to rotational transform of the color coordinates. The rotational transfer matrix 7 adopts a general rotational transform formula.

Figure 2:
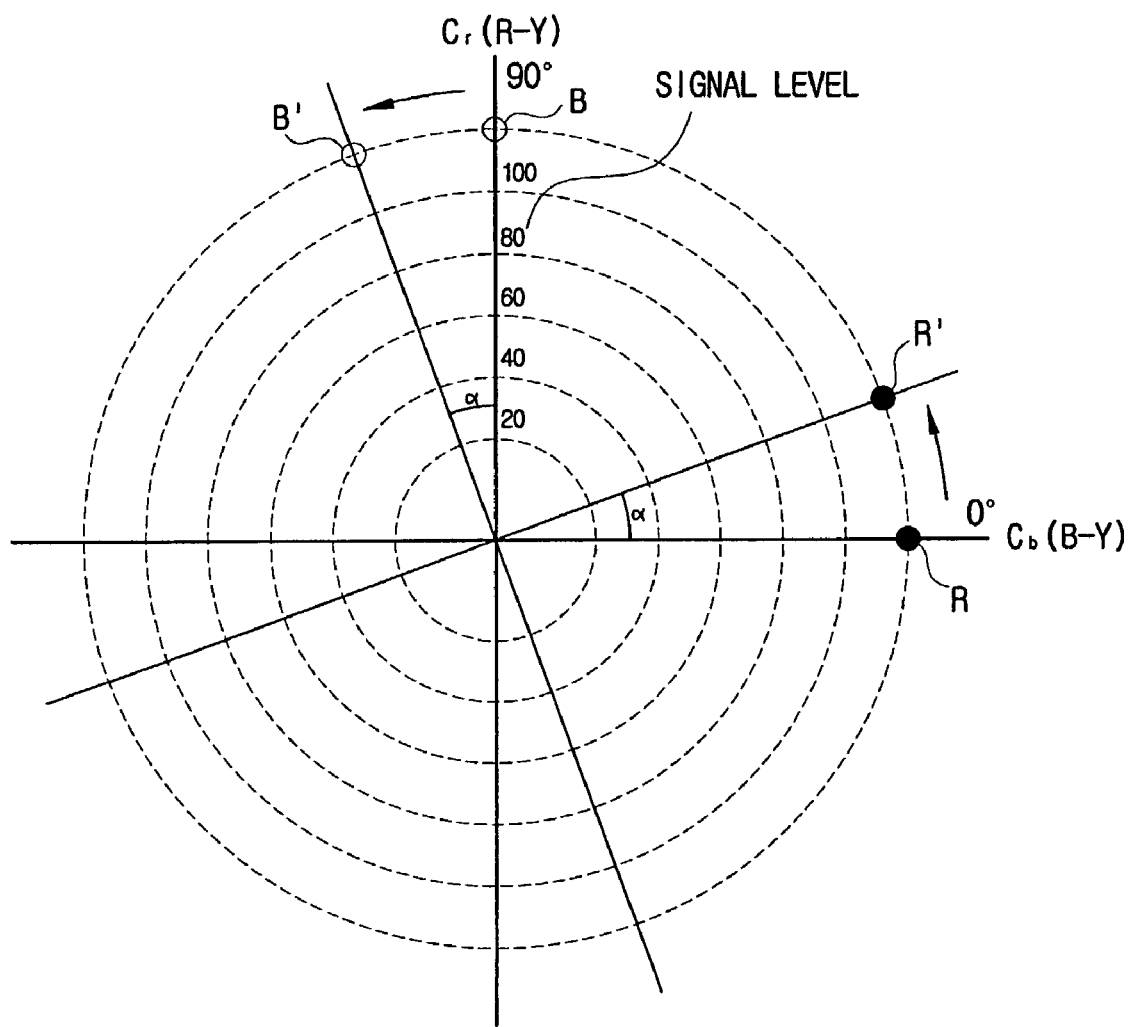
FIG. 2 is a graph showing rotational transform of color coordinates.

Hereinbelow, the rotational transform of the color coordinates will be described by applying the rotational transfer matrix 7, referring to FIG. 2. As shown in FIG. 2, in the color coordinates, horizontal and vertical axes indicate the chrominance signals of "$C_b$(B-Y)" and "$C_r$(R-Y)", respectively.

In the color coordinates, a point is transferred from a phase "p" to a phase "q" by a rotational transform formula as follows.

$$\begin{pmatrix} \cos(q) & -\sin(q) \\ \sin(q) & \cos(q) \end{pmatrix} \begin{pmatrix} \cos(p) & -\sin(p) \\ \sin(p) & \cos(p) \end{pmatrix} \qquad \text{<formula 1>}$$

By using the above rotational transform formula, if points R on the "$C_b$" axis and B on the "$C_r$" axis, as shown in FIG. 2, are transferred to points R' and B' by rotating through a phase "α", they are represented as follows.

Because the point R is positioned on the "$C_b$" axis, the point R is transferred to the point R' by rotating from a phase 0° to the phase "α".

By formula 1, $$C_b(\text{or } P_b)[Cb(\text{or } Pb)] = \begin{pmatrix} \cos(\alpha) & -\sin(\alpha) \\ \sin(\alpha) & \cos(\alpha) \end{pmatrix} \begin{pmatrix} \cos(0) & -\sin(0) \\ \sin(0) & \cos(0) \end{pmatrix} \qquad ①$$

Further, because the point B is positioned on the "$C_r$" axis, the point B is transferred to the point B' by rotating from a phase 90° to the phase "α".

By formula 1, $$C_r(\text{or } P_r)[Cr(\text{or } Pr)] = \qquad ②$$
$$\begin{pmatrix} \cos(\alpha+90) & -\sin(\alpha+90) \\ \sin(\alpha+90) & \cos(\alpha+90) \end{pmatrix} \begin{pmatrix} \cos(90) & -\sin(90) \\ \sin(90) & \cos(90) \end{pmatrix}$$

According to equations ① and ②,

[Cb(or Pb)=Cb(or Pb)×cos (α)×Cr(or Pr)×sin (α)]$C_b$
(or $P_b$)=$C_b$(or $P_b$)×cos (α)×$C_r$(or $P_r$)×sin (α)    ③

[Cr(or Pr)]=-Cb(or -Pb)×sin (α)×Cr(or Pr)×cos
(α)]$C_r$(or $P_r$)=$C_b$(or $P_b$)×cos (α)×$C_r$(or $P_r$)×sin
(α)    ④ wherein, the phase "α" is a hue adjusting value determined according to the adjustment of the hue adjusting part 10, and ranges within ±180° on the color coordinates. Therefore, the "R-Y" and "B-Y" indicating the chrominance signals are adjusted according to the phase "α" by rotation-transforming the color coordinates within ±180°, thereby adjusting hue. Thus, the color coordinates are rotated optionally by the rotational transfer matrix 7 at a phase "α" determined at the hue adjusting part 10.

On the other hand, a "Y" element indicating a luminance signal is not transferred by the rotational transfer matrix 7 because the "Y" signal is not concerned with the hue adjustment depending upon the color coordinates.

Consequently, the chrominance signals (see Eqs. ③ and ④) transferred by the rotational transfer matrix 7 and the luminance signal "Y" are converted into the digital RGB signals through the color transfer matrix 9. The converted digital RGB signals have hue adjusted by rotation-transforming the color coordinates at a desired phase "α".

FIG. 1 illustrates the color transfer matrix 9 converting the $YC_bC_r$ signals into digital RGB signals according to only the ITU-RBT601 format, but a color transfer matrix 9 may be altered according to the format of the inputted video signal.

Figure 3:
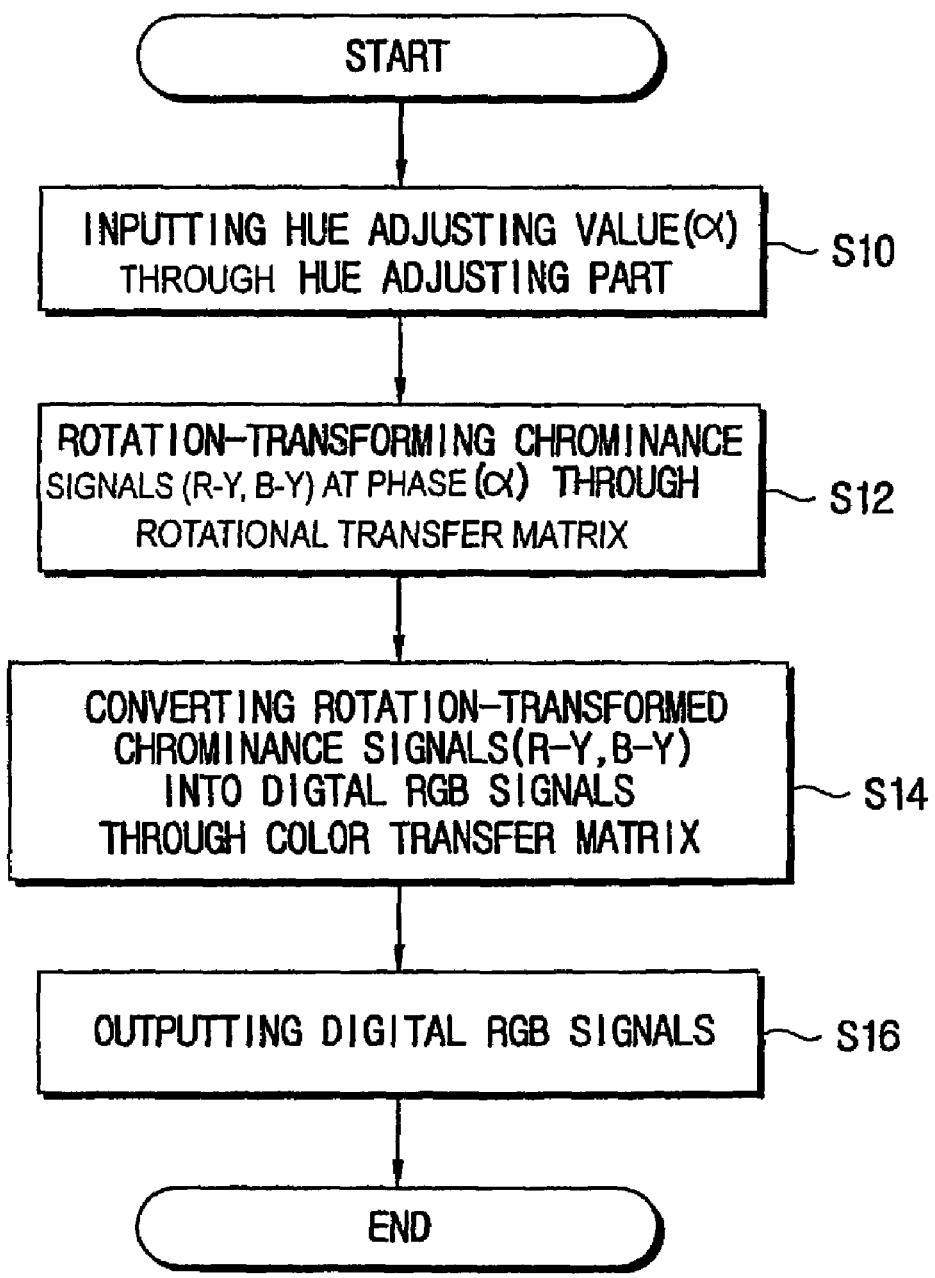
FIG. 3 is a control flow chart of a video signal processing method according to another embodiment of the present invention.
Figure 4:
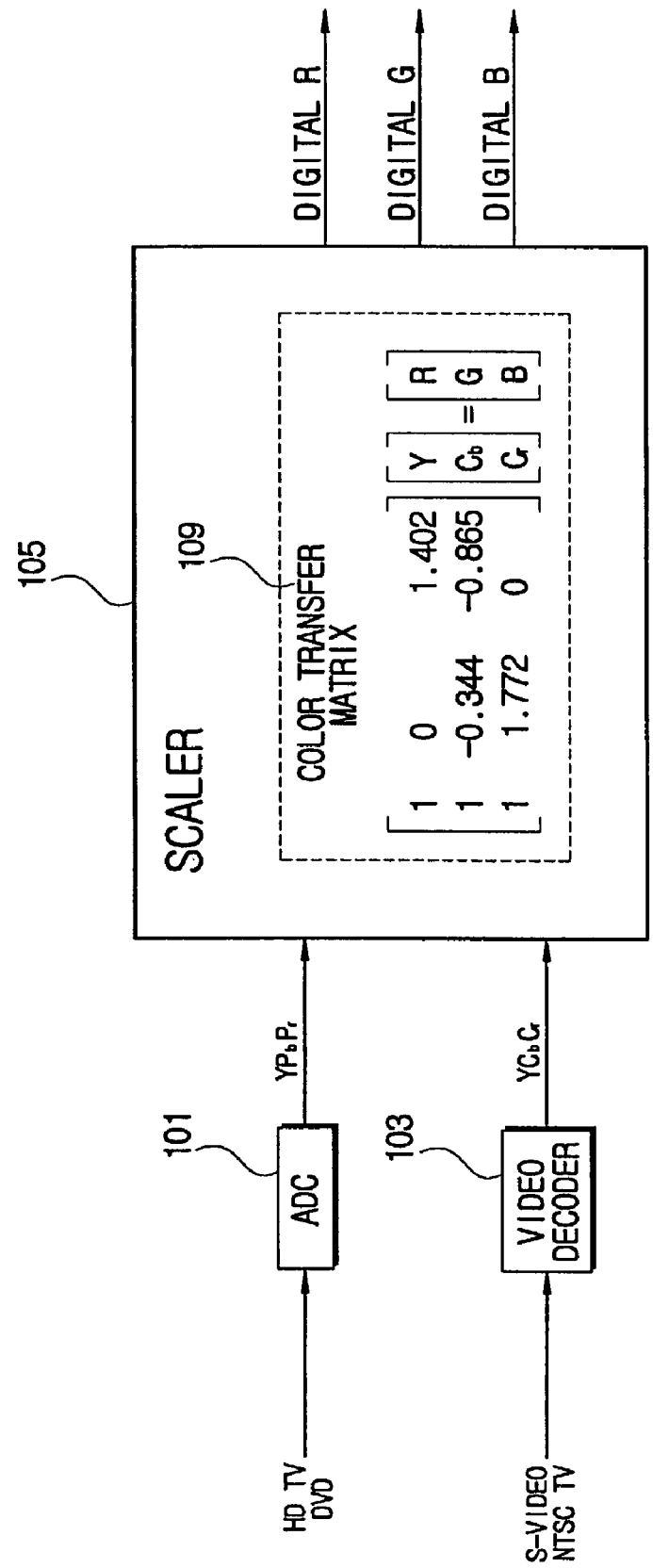
FIG. 4 is a control block diagram of a conventional digital video signal processing system.

Hereinbelow, a method of processing a video signal in the digital video signal processing system will be described referring to FIG. 3.

In order to adjust the hue of the $YP_bP_r$ or $YC_bC_r$ signals, the hue adjusting value "α" is inputted through the hue adjusting part 10 (S10). Depending upon the inputted adjusting value "α", the color coordinates of the chrominance signals "R-Y ($C_r$ or $P_r$)" and "B-Y($C_b$ or $P_b$)" are rotated through the rotational transfer matrix 7 at the phase "α" (S12). Thereafter, the rotated chrominance signals and the luminance signal are transferred through the color transfer matrix 9 previously determined according to the format of the video signal (S14), thereby being converted into the digital RGB signals (S16). Finally, the converted digital RGB signals can be displayed on the panel through a panel driver (not shown).

Thus, by providing a rotational transfer matrix operation of the color coordinates prior to a color transfer matrix which has been used in the conventional scaler, and by setting the rotation-transforming value of the rotational transfer matrix through a hue adjusting part, the scaler can adjust the color coordinates by adding software to the internal micro computer of the scaler.

As described above, the present invention provides a digital video signal processing system and method, in which a rotational transform of color coordinates is accomplished by a rotational transfer matrix prior to a color transfer matrix of a scaler without hardware components therefor.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A digital video signal processing system for displaying a digital video signal on a display panel comprising:
    at least one video decoder processing a video signal and outputting a luminance signal and chrominance signals;
    a scaler converting the luminance signal and the chrominance signals into a digital RGB signal, and converting the luminance signal and the chrominance signals into the digital RGB signal fit for the display panel according an output format of the display panel; and
    a hue adjusting part generating an adjusting value to adjust hue represented by the chrominance signals,
    wherein the scaler comprises an operating part operating a rotational transfer matrix rotation-transforming color coordinates of the chrominance signals according to the adjusting value.

2. The digital video signal processing system according to claim 1, wherein the adjusting value defines a phase rotation-transforming the color coordinates of the chrominance signals.

3. The digital video signal processing system according to claim 1, wherein the adjusting value ranges within ±180 degrees on the color coordinates.

4. The digital video signal processing system according to claim 1, wherein the luminance signal is not transferred by the rotational transfer matrix.

5. The digital video signal processing system according to claim 1, wherein one of the video decoders processes a high definition video signal and another of the video decoders processes a standard definition video signal.

6. The digital video signal processing system according to claim 5, wherein the rotated chrominance signals and the luminance signal are transferred through a color transfer matrix included within the scaler, the color transfer matrix having been determined according to a format of the video signal, thereby converting the chrominance and luminance signals into the digital RGB signal.

7. A digital video signal processing method comprising a scaler scaling a video signal, the method comprising:
    processing the video signal and outputting a luminance signal and chrominance signals from at least one video decoder to the scaler;
    inputting an adjusting value adjusting hue represented by the chrominance signals comprised in the video signal;
    rotation-transforming color coordinates of the chrominance signals depending upon the inputted adjusting value through a rotational transfer matrix in the scaler; and
    converting, in the scaler, the rotation-transformed chrominance signals and the luminance signal into a digital RGB signal fit for a display panel according to an output format of the display panel.

8. The digital video signal processing method according to claim 7, wherein said rotation-transforming the color coordinates is independent of a luminance signal.

9. The digital video signal processing method according to claim 7, wherein the video signals processed are a high definition video signal and a standard definition video signal.

10. A digital video signal processing program executed on a scaler for converting a video signal having a luminance signal and chrominance signals into a digital RGB signal by:
    receiving the luminance signal and the chrominance signals from at least one video signal decoder;
    inputting an adjusting value adjusting hue represented by the chrominance signals;
    rotation-transforming color coordinates of the chrominance signals depending upon the inputted adjusting value through a rotational transfer matrix program in the scaler; and
    converting, in the scaler, the rotation-transformed chrominance signals and the luminance signal into the digital RGB signal fit for a display panel according to an output format of the display panel.

11. A scaler for storing information for a digital video signal processing program being executed in a digital video signal processing system to scale a video signal, the scaler comprising:
    a decoded video signal decoded into a luminance signal and chrominance signals from at least one video signal decoder;
    an adjusting value stored to adjust hue represented by the chrominance signals comprised in the video signal;
    color coordinates of the chrominance signals rotation-transformed depending upon the adjusting value through a rotational transfer matrix in the scaler; and
    the digital RGB signal converted from the rotation-transformed chrominance signals and the luminance signal, the digital RGB signal fit for a display panel according to an output format of the display panel.

12. The scaler according to claim 11, wherein the rotational transfer matrix is stored on the storage medium.

13. A digital video signal processing system for displaying a digital video signal on a display panel comprising:
    a scaler converting the video signal having a luminance signal and chrominance signals into a digital RGB signal, and converting the video signal into an output format fit to the display panel; and
    a hue adjusting part generating an adjusting value to adjust hue represented by the chrominance signals,
    wherein the scaler comprises an operating part operating a rotational transfer matrix rotation-transforming color coordinates of the chrominance signals according to the adjusting value; and wherein the rotational transfer matrix transfers a point "P" at a phase "p" to a point "Q" at a phase "q" and is represented by $$Q = \begin{pmatrix} \cos(q) & -\sin(q) \\ \sin(q) & \cos(q) \end{pmatrix} \begin{pmatrix} \cos(p) & -\sin(p) \\ \sin(p) & \cos(p) \end{pmatrix}.$$

14. A digital video signal processing method comprising a scaler scaling a video signal, the method comprising:
inputting an adjusting value adjusting hue represented by chrominance signals comprised in the video signal;
rotation-transforming color coordinates of the chrominance signals depending upon the inputted adjusting value through a rotational transfer matrix; and
converting the rotation-transformed chrominance signals into a digital RGB signal;
wherein the rotational transfer matrix transfers a point "P" at a phase "p" to a point "Q" at a phase "q" and is represented by $$Q = \begin{pmatrix} \cos(q) & -\sin(q) \\ \sin(q) & \cos(q) \end{pmatrix} \begin{pmatrix} \cos(p) & -\sin(p) \\ \sin(p) & \cos(p) \end{pmatrix}.$$

15. The digital video signal processing method according to claim 14, wherein the adjusting value defines a phase rotation-transforming color coordinates of the chrominance signals.

16. A digital video signal processing program executed on a scaler for converting a video signal having a luminance signal and chrominance signals into a digital RGB signal by:
inputting an adjusting value adjusting hue represented by the chrominance signals;
rotation-transforming color coordinates of the chrominance signals depending upon the inputted adjusting value through a rotational transfer matrix program; and
converting the rotation-transformed chrominance signals into the digital RGB signal;
wherein the rotation-transforming comprises calculating the rotational transfer matrix program transferring a point "P" at a phase "p" to a point "Q" at a phase "q" in a rotational coordinate space.

17. The digital video signal processing program according to claim 16, wherein the rotational transfer matrix program transferring a point "P" at a phase "p" to a point "Q" at a phase "q" is represented by $$Q = \begin{pmatrix} \cos(q) & -\sin(q) \\ \sin(q) & \cos(q) \end{pmatrix} \begin{pmatrix} \cos(p) & -\sin(p) \\ \sin(p) & \cos(p) \end{pmatrix}.$$

* * * * *

UNITED STATES PATENT AND TRADEMARK OFFICE
CERTIFICATE OF CORRECTION

PATENT NO. : 7,098,965 B2
APPLICATION NO. : 10/224557
DATED : August 29, 2006
INVENTOR(S) : Hak-jae Kim It is certified that error appears in the above-identified patent and that said Letters Patent is hereby corrected as shown below:

Column 5, Line 39, insert --to-- before "an output".

Signed and Sealed this

Thirteenth Day of February, 2007

JON W. DUDAS
*Director of the United States Patent and Trademark Office*